United States Patent [19]

Freudenberg

[11] Patent Number: 4,687,171

[45] Date of Patent: Aug. 18, 1987

[54] MOUNT

[75] Inventor: Tillmann Freudenberg, Weiterstadt, Fed. Rep. of Germany

[73] Assignee: Firma Carl Freudenberg, Weinheim/Bergstr., Fed. Rep. of Germany

[21] Appl. No.: 688,186

[22] Filed: Jan. 2, 1985

[30] Foreign Application Priority Data

Jan. 28, 1984 [DE] Fed. Rep. of Germany ....... 3403002

[51] Int. Cl.⁴ .............................................. F16M 5/00
[52] U.S. Cl. .................................... 248/550; 248/636; 248/638; 248/562; 267/140.1; 267/196
[58] Field of Search ............... 248/550, 559, 561, 562, 248/563, 566, 636, 637, 638; 267/140.1, 141, 8 R, 9 R; 188/271, 567

[56] References Cited

U.S. PATENT DOCUMENTS

| | | | |
|---|---|---|---|
| 3,223,214 | 12/1965 | Kuivinen | 267/9 R |
| 4,476,969 | 10/1984 | Dykema | 188/380 |
| 4,492,366 | 1/1985 | Ozawa | 267/140.1 |
| 4,502,652 | 3/1985 | Breitbach | 188/380 |
| 4,511,114 | 4/1985 | Cawley | 248/550 |
| 4,553,744 | 11/1985 | Konishi | 267/140.1 |

Primary Examiner—Reinaldo P. Machado
Assistant Examiner—Alvin Chin-Shue
Attorney, Agent, or Firm—Felfe & Lynch

[57] ABSTRACT

A mount for connecting two relative-vibratable objects has two resilient elements and a signal actuated clutch for connecting the objects. The clutch is in parallel with one of the resilient elements and in parallel with the other. A sensor senses the vibrations applied across the mount and actuates the clutch in response thereto to change the transfer function of the mount. Appropriately controlling the engagement/disengagement actuation of the clutch in this way makes it possible to avoid the resonant frequencies of the mount and thus both isolate and damp the vibrations as desired without structural changes to the mount.

21 Claims, 15 Drawing Figures

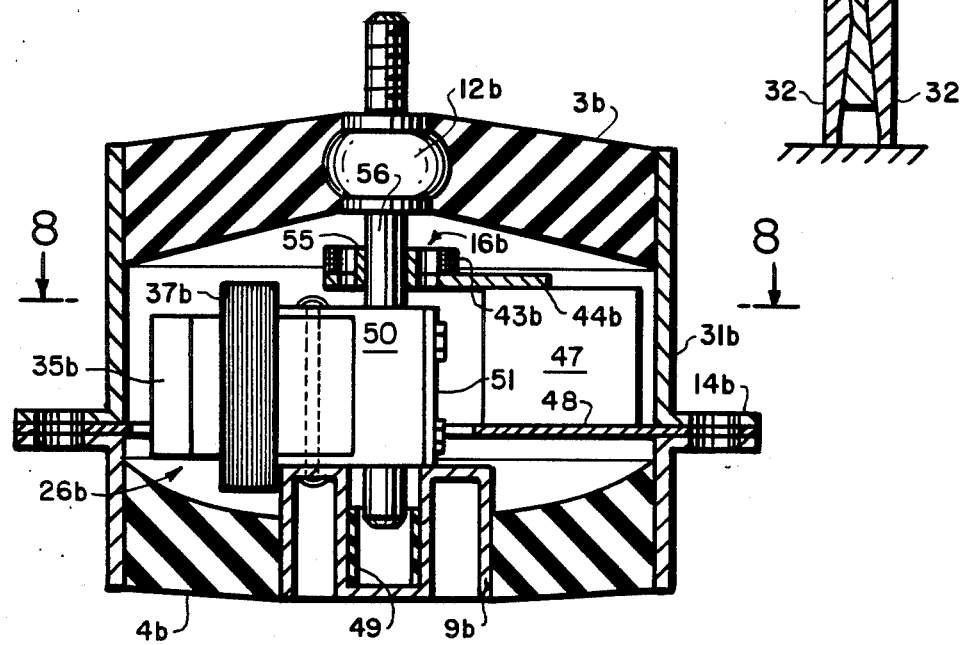
FIG.6
FIG.7
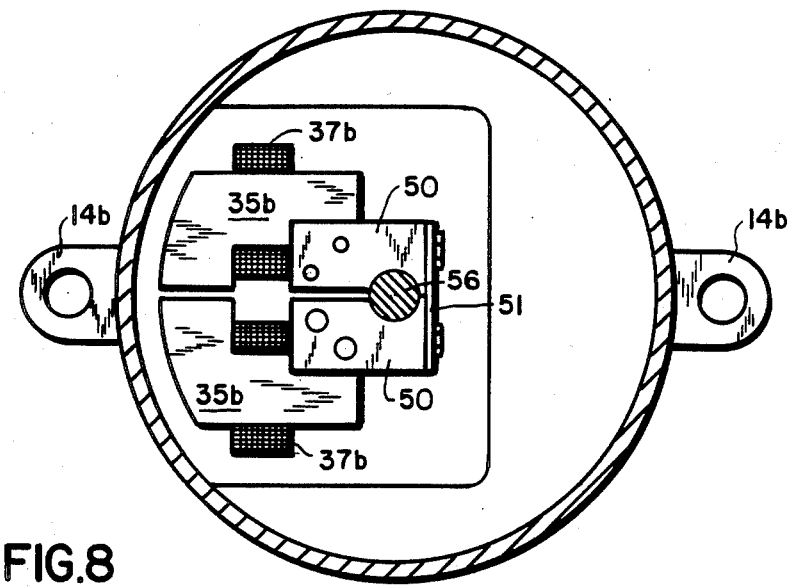
FIG.8

MOUNT

BACKGROUND OF THE INVENTION

The invention relates to a mount for connecting two relatively-vibratable objects and, more particularly, an engine mount.

An engine mount having first and second resilient elements and a damper for the suppressing large relative movements is known from published German patent application DOS No. 26 18 333. It is intended for supporting an internal-combustion engine in a motor vehicle and is said to prevent the transmission of disturbing vibrations from the engine to the chassis.

Another engine mount is disclosed in published German patent application DOS No. 26 16 258. It is basically afflicted with the same difficulties and drawbacks as the design according to published German patent application DOS No. 26 18 333. Especially when there is pronounced rocking motion of the supported engine, disturbing throbbing vibrations are set up in the chassis, and these cannot be readily eliminated. Modification of the individual parts of such an engine mount would be required.

The vibrations introduced into the mount for an internal-combustion engine in a vehicle are of two different types.

The first type occurs in the frequency range above about 30 Hz and is produced by the engine itself. These vibrations have a very small amplitude of a few tenths of a millimeter but manifest themselves in the vehicle as annoying, throbbing vibrations. To prevent this, they should be isolated from the chassis to the extent possible.

The second type of vibrations occurs in a frequency range of up to about 12 Hz and is produced when the vehicle travels over a rough road. In extreme cases, these vibrations may shake the engine with amplitudes reaching as much as about 10 centimeters. In the case of a passenger-automobile engine, for example, such excursions are intolerable. Therefore, they must be suppressed.

This can be done with a damper, for example, a stiff spring between the engine and the relatively-immovable chassis. However, this dynamically stiffens the junction between engine and chassis or, in other words, hardens the engine mount. This impairs the isolating action of the mount and, hence, results in transmitting the throbbing vibrations to the chassis.

A satisfactory compromise between the need to suppress the second, larger-amplitude motions of the engine and the desire to suppress the first, higher-frequency, disturbing, throbbing vibrations is not readily possible because each depends on a different transfer characteristic. The transfer characteristic depends on the arrangement and dimensioning of the structural members of the mount. Modifications therefore require the use of differently arranged and/or sized structural members and, thus, great expense.

SUMMARY OF THE INVENTION

The invention therefore has as an object improving an engine mount of the type outlined above so that unacceptable large-amplitude motion of the engine is substantially suppressed while higher-frequency motion is well isolated.

In accordance with the invention, this object is achieved with a mount for connecting two relatively-vibratable objects. It has a signal-actuated clutch in series with one resilient element and in parallel with another for connecting the objects in the vibration direction. A sensor senses the amplitude, the frequency or a related property like acceleration of the vibrations applied across the mount and provides a corresponding signal for actuating the clutch to change thereby the transfer function of the mount.

The clutch, resilient elements, and sensor are, of course, arranged to change the transfer function of the mount in the way desired for operation. In the vehicle engine mount example described above, for example, the higher-frequency, smaller-amplitude, engine-caused vibrations are sensed to cause the clutch to subtract (remove) the resilience of one resilient element from across the mount, thereby reducing the stiffness of the mount and improving its isolation of these vibrations. Sensing the other, lower-frequency, larger-amplitude, road-caused vibrations oppositely adds the resilience of the resilient element to stiffen the mount and improve its damping of these vibrations.

In merely adding or subtracting the resilience of one of the two resilient elements across the mount in this way, the clutch never has to absorb all of the vibrational force across the mount. This is important in practice because the forces can be too large to absorb practically in a mount-sized clutch. The clutch can, however, absorb some of the vibration force, and preferably does so to provide a smooth transition in the clutch-responsive transfer function of the mount.

Further, adding and subtracting resilience with the clutch changes the resonant frequency of the mount which is, of course, the frequency to be avoided for effective isolation or damping. Proper dimensioning of the resilient elements and application of the clutch can, therefore, avoid the resonant frequencies as later described in more detail.

In one preferred embodiment, the signal-actuated clutch is connected in series with a resilient element and the unit formed by the series-connected clutch and resilient element is connected in parallel with another resilient element. The sensor senses the relative movements across the mount, for example between a pedestal and a mounting fixture on opposite ends of the mount, and transmits a corresponding signal to the clutch for varying the motional transmission therethrough, preferably when a threshold value is exceeded.

When the sensor signals the clutch for more motional transmission therethrough (engagement), the resilience of the resilient element in series with the clutch is more coupled to that of the resilient element in parallel therewith to change the transfer function of the mount, and vice versa. For an engine mount, it has been found advisable for the resilient element in series with the clutch to have a harder spring characteristic than the resilient element in parallel therewith.

In another preferred embodiment, the engine mount has an intermediate plate between a pedestal and a mounting fixture. A first resilient element is disposed between the pedestal and the intermediate plate and a second resilient element and signal-actuated clutch are disposed in parallel between the intermediate plate and the mounting fixture. In this case, therefore, engaging the clutch removes the resilience of the parallel-connected element, and vice versa.

BRIEF DESCRIPTION OF THE DRAWINGS

The present invention will now be described in greater detail with reference to the accompanying drawings of merely-illustrative preferred embodiment, wherein:

FIG. 6 is an enlarged sectional elevation of a plate portion of the embodiments of FIGS. 3 and 4;

FIG. 7 is a sectional elevation of a second embodiment of the mount of FIG. 2;

FIG. 8 is a plan view, partly in cross section, of a portion of the embodiment shown in FIG. 7;

DESCRIPTION OF THE PREFERRED EMBODIMENTS

Figure 1:
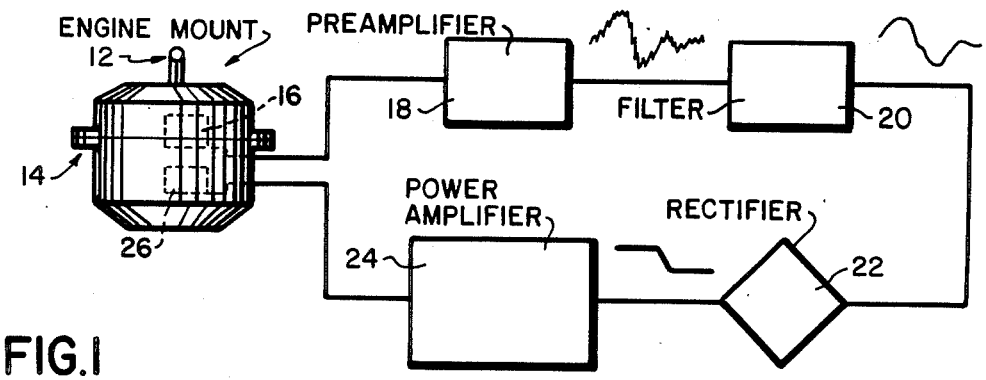
FIG. 1 schematically shows a mount system.

FIG. 1 shows schematically the entire system associated with an engine mount 10 for its use in mounting an engine (not shown) at 12 on a vehicle (not shown) at 14. The engine mount 10 has a sensor 16 for sensing the amplitude, frequency or acceleration, etc. of vibrations between the engine and vehicle at 12, 14. A signal corresponding to the sensed vibrations from sensor 16 is preamplified in preamplifier 18, filtered (smoothed) in filter 20, and rectified in rectifier 22 to control a power amplifier 24 correspondingly. The power amplifier 24 then correspondingly operates a signal-actuated clutch 26 to vary the transmission of the vibrational motion between the engine at 12 and the vehicle at 14 through the clutch.

The clutch 26 is associated in a series/parallel-arranged system with two resilient elements for adding or subtracting (removing) the resilience of one of the resilient elements from the system in dependence upon the vibrational transmission through the clutch. The system of the clutch and two resilient elements forms the operative or dynamic connection across the mount 10 between the engine at 12 and vehicle at 14. The clutch thus controls the transfer function of the mount.

Figure 2:
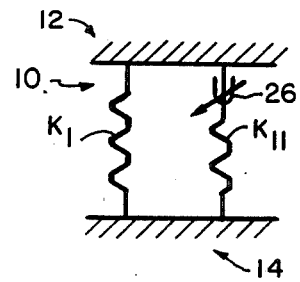
FIG. 2 is a mechanically-equivalent schematic of one embodiment of a mount portion of the system of FIG. 1.

The system shown in FIG. 2, for example, adds the resilience of resilient element $K_{II}$ to that of resilient element $K_I$ when the clutch 26 is engaged to transmit therethrough the motion between the engine at 12 and vehicle at 14. When the clutch 26 is fully engaged, for example, resilient elements $K_I$ and $K_{II}$ are connected in parallel across the mount. When the clutch 26 is disengaged, however, resilient element $K_{II}$ is un-coupled from the system so that only the resilience of resilient element $K_I$ is operative across the mount.

Figure 3:
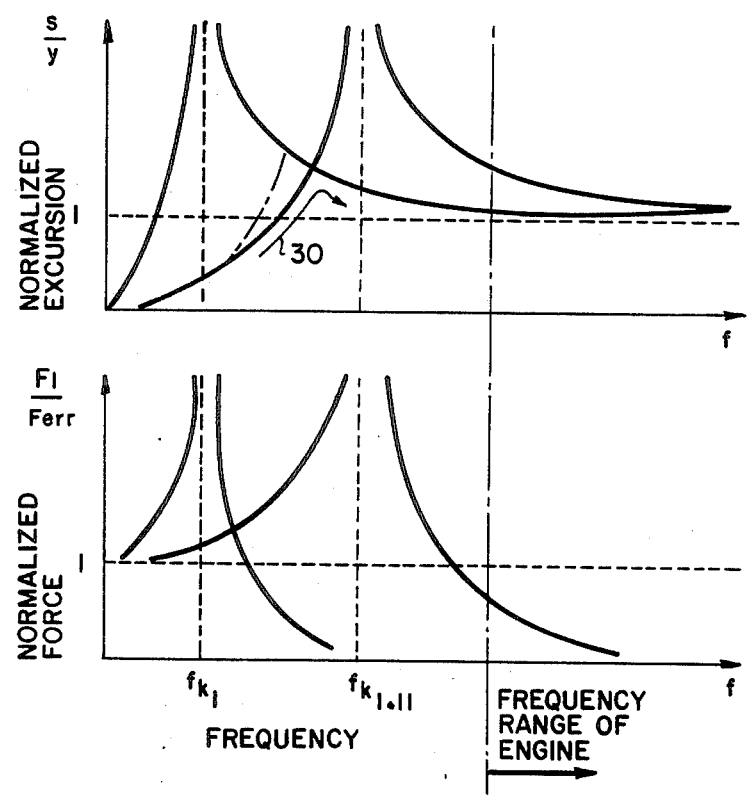
FIG. 3 shows the transfer functions of the mount of FIG. 2.

The corresponding resonance or magnification functions are shown in FIG. 3 wherein s is the excursion across the mount, between the engine at 12 and vehicle at 14, normalized by the excursion of the vehicle y and corresponding forces $F_L$ and $F_{err}$ as functions of frequency f. The resonance frequencies $f_{KI+II}$ for the case of the two resilient elements $K_I$, $K_{II}$ when coupled by the clutch 26 and $f_{KI}$ when decoupled are indicated and, of course, represent the regions to be avoided.

For simplification, suppose that the coupling forces of clutch 26 are greater at any given time than the spring forces of the resilient elements $K_I$, $K_{II}$. This means that the resilient elements are rigidly coupled, in other words, connected in parallel. Assume, further, an exciting frequency f which gradually increases 0 Hz (road vibrations) to higher frequencies (engine vibrations).

Because the resilient elements are parallel-connected, the system response up along the ascending leg of the magnification curve with the critical resonance frequency $f_{KI+II}$. This situation is continued until the resonance frequency $f_{KI}$ resulting from the mass of the engine and the elasticity of resilient element $K_I$ has been passed by a sufficient distance.

The sensor 16 then signals the clutch 26 to decouple. Now, assuming for simplification that the forces of the clutch become very small, resilient element $K_{II}$ is practically no longer coupled to the engine. The engine then is supported only on resilient element $K_I$ and, as the exciting frequency f (now generally from the engine) continues to increase, the system response follows the descending leg of the magnification curve with the critical resonance frequency $f_{KI}$ as generally indicated by arrow 30. It thus becomes apparent that the two critical resonance frequencies of the two resilient elements can be bypassed in this way by rigidly coupling and uncoupling a second resilient element as soon as, practically the resonance frequencies are sufficiently far apart.

In the actual design of an engine mount in accordance with the invention, however, it is not sought to connect the resilient elements rigidly as this would require very large forces and a desirably-smooth changeover from one characteristic to the other would hardly be possible. Moreover, it is advantageous for the operation of the engine mount that the resilient elements not be stressed relative to each other into just any position but always so that there is sufficient room for deflection of both resilient elements on either side of the static rest position. Overloading (bottoming) of the individual resilient elements then is reliability prevented. This may be accomplished, for example, by keeping the holding force of the clutch at all times smaller than the maximum permissible spring force of the resilient elements so that, after a given excursion across the mount, the clutch members slide apart, thus reducing possible stressing of the resilient elements relative to each other.

The relative displacement within the clutch generally has a damping effect. In principle, however, the considerations concerning rigid coupling and uncoupling are still applicable. However, the magnification function of the undamped system of FIG. 2 is distorted approximately as shown by the dashed line in FIG. 3 until the relative displacements within the clutch cease and the engine/engine mount system behaves as an undamped vibrating system with the function shown about one of the critical resonance frequencies.

Since the exciting frequencies steming from the engine are higher, the two resonant frequencies of the clutch-differentiated vibrating systems show in FIG. 3 can be located at a far lower level than the frequencies which are generated by the engine, as shown. The chassis of the motor vehicle thus is at all times well isolated from throbbing vibrations, regardless of the magnitude of the holding forces of the clutch. Yet there is no need to put up with pronounced rocking motion of the engine in traveling over a rough road by going through critical resonant frequencies.

Thus, the sensor 16 incorporated in the engine mount signals the rate of displacement s. Different frequencies are usually superimposed on the signal which is first preamplified and then filtered. The filter only passes low frequencies so that, when only high frequencies generated by the engine are present, as in traveling over a smooth, level road, no signal will appear on the output side of the filter. Low frequencies which could result in excessive engine motion are, however, passed by the filter, rectified and amplified.

On the output side of the power amplifier 24, a direct current that is proportional to the amplitude of the rate of displacement in the engine mount is present. This direct current is used to actuate the clutch 26 via an electromagnetic drive.

The clutch is therefore actuated only when there would be excessive engine motion, i.e. only when low frequencies and large amplitudes are present. It is not actuated the rest of the time. For this reason, the system consumes very little current.

In addition, the damping action can be electrically adapted to different operating situations without modification of structural parts and similarly, adjusted for optimum values, for example, for complete supression of the damping action in one frequency range and·for extremely strong damping action in another frequency range.

There is no reaction between the resilient elements and the clutch of the proposed engine mount, and this is true over the entire frequency range of the vibrations introduced. Both the resilient elements and the damping means can therefore be designed optinally on the basis of their actual functions which cannot be done, for example, in the case of the hydraulic damping.

The proposed engine mount is very sturdy and relatively simple to fabricate. Also, the isolating and damping action obtained will remain absolutely constant over a long period of time.

Figure 4:
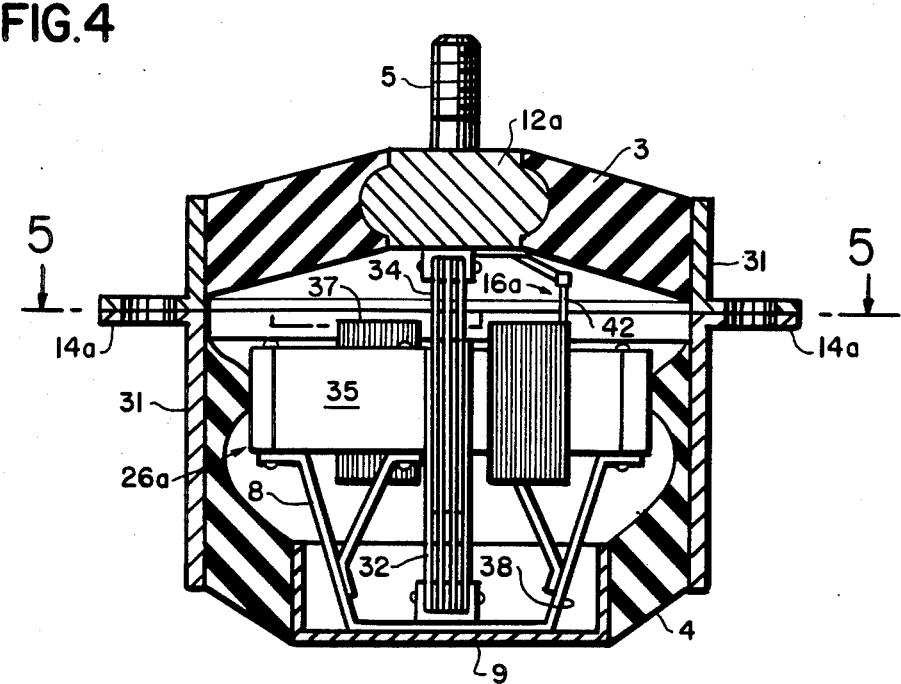
FIG. 4 is a sectional elevation of one embodiment of the mount of FIG. 2.
Figure 5:
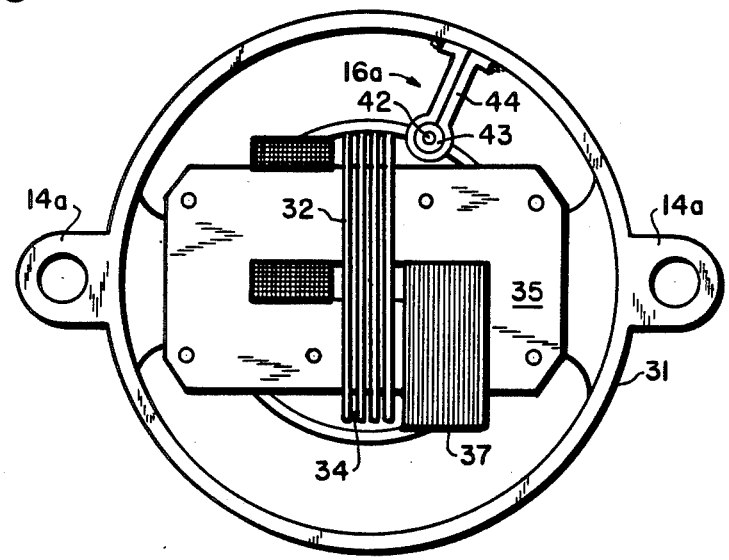
FIG. 5 is a plan view, partly in cross section, of a portion of the embodiment shown in FIG. 4.

The engine mount shown in FIGS. 4 and 5 embodies the above principles. It has a cylindrical mounting fixture 31 made of sheet metal and provided with a flange 14a for securing the mount to the chassis of a vehicle.

At its upper end, as shown, the engine mount has a pedestal 12a in the form of a rotationally-symmetric metallic body and a threaded stud 5 for securing the mount to an engine. The pedestal and mounting mixture are united by a resilient element and 3 which, therefore, corresponds to element $K_I$ in FIG. 2. It is formed of a rubber-elastic material.

At its lower end, as shown, a harder resilient element ($K_{II}$ in FIG. 2) unites the mounting fixture 31 and a bottom member 9. The bottom member and the pedestal are interconnected by a pack of interleaved bottom plates 32 and pedestal plates 34. These plates are rigidly attached to the bottom member and the pedestal, respectively, but are able to slide between one another where they overlap under the control of an electromagnet. The electromagnet has a magnetic core 35 and coil 37 mounted on the bottom member 9 by a support 38 in such a way that the pack of plates is located in a pole face gap of the electromagnet with the pole faces of the magnetic core bearing on the bottom plates 10. The plates are slotted longitudinally (not shown) to prevent a magnetic short circuit. Together, therefore. these elements form a signal-actuated clutch at 26a (FIG. 4) series connected with resilient element 4 and therewith in parallel relative to resilient element 3. Accordingly, these correspond to clutch 26 and resilient elements $K_I$ in FIG. 2.

The engine mount also has an inductive sensor at 16a which senses the rate of displacement of the pedestal 12a relative to the mounting fixture 31 and its flange 14a. The sensor has a core 42 which is attached to the pedestal 12a as shown in FIG. 4 and a coil 43 which is secured to the mounting fixtures 31 by a support 44 as shown in FIG. 5.

The sensor is connected to an electronic control unit (as shown in FIG. 1) that supplies the coil 37 of the electromagnet with current on the basis on the rate of displacement of the mounting fixture relative to the pedestal, and thus on the basis of the vibration frequency and amplitude therebetween, to clamp the plates 32, 34 together electromagnetically in the gap of the electromagnet correspondingly.

Shown in FIG. 6 is a special design of plates for an engine mount according to FIGS. 4 and 5. The plates 32', 34' have interfitting, chevron surfaces, as a result of which these plates exactly fit into one another in a central position but must be spaced upon relative translation from vibration thereby affecting the flux path of the electromagnet. This arrangement is, therefore, in a sense intermediate between frictional engagement and interlocking engagement.

The engine mount shown in FIG. 6 is similar to that of FIGS. 4 to 6, except in the clutch 26b and sensor 16b.

For the clutch, a support 48 holds electromagnet 35b and coils 37b on mounting fixture 31b Separate therefrom are two, tongs-like magnet clamping blocks 50 joined by a spring plate 51 forming a hinge. One of the clamping blocks 50 is permanently riveted to the bottom 9b. The other is movable on the hinge. The clamping block 50 act on a columnar body 56 which is fixed to the pedestal, 12b under the action of electromagnet 35b and thus provide frictional engagement between the pedestal 12b and the bottom 9b. The columnar body 56 will, therefore, hereinafter be referred to as a friction cylinder.

For the sensor 16b, a permanent magnet ring 55 is fixed to the upper portion of the friction cylinder and inserted into a primary-detector coil 43b held by a support 44b. The sensor and clutch coact as in the engine mount of FIGS. 4 to 6 through controls 47 shown in detail in FIG. 1. However, in the engine mount according to FIGS. 7 and 8, a displacement-transducer coil 49 into which the friction cylinder is introduced makes it possible to measure also the displacement between the pedestal 12b and the bottom 9b and thus to interconnect the soft resilient element 3b and the hard resilient element 4b in a specific mutual relationship.

Figure 9:
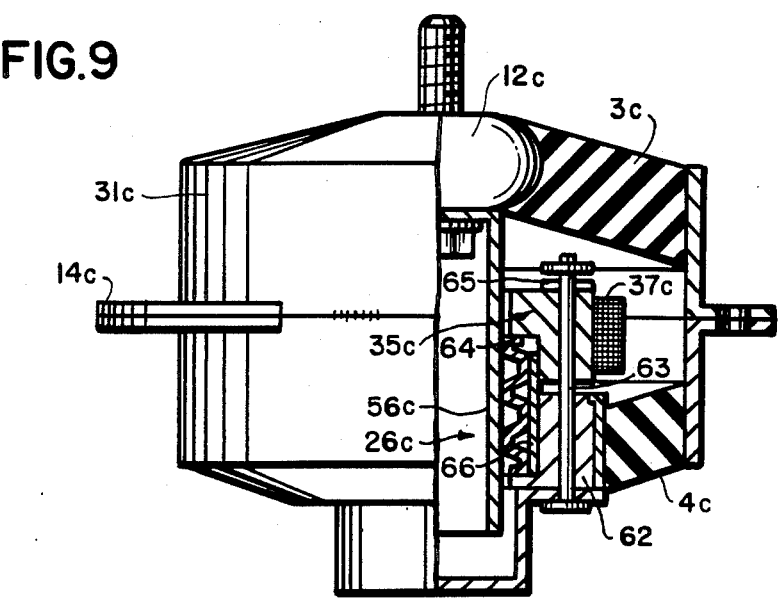
FIG. 9 is an elevation, partly in section, of a third embodiment of the mount of FIG. 2.

The engine mount of FIG. 9 basically differs from the embodiments according to FIGS. 4 and 5 only by the design of the clutch 26c. It consists of an annular electromagnet coil piece 37c and an iron ring 62 which are axially spaced from each other when the clutch is not actuated. These two parts surround the friction cylinder 56c which is attached to the pedestal 12c and are provided with radially extending support surfaces facing said cylinder. The support surfaces axially secure a clamping sleeve 64 which is disposed in a resulting clearance between said two parts and the friction cylinder. The clamping sleeve is crenellated. It abuts on its radial outside on the inner surface of a sliding sleeve 66 and therefore cannot yield outwardly in the radial direction when axial pressure is exerted by the support surfaces upon electro-magnetic movement of the magnet piece 37 toward the iron ring 62 along guiding pin 63. An abutment washer 65 on the pin forms a soft stop.

The axial pressure thus causes the clamping sleeve to be pressed against the surface of the friction cylinder 20 which, as before, cuts in the harder resilient element 4c when the clutch is actuated. The actions of the lower and upper resilient elements 3c, 4c then complement each other in the sense of a parallel circuit. The resonant frequency of the vibrating system formed of engine mount and engine thus is considerably shifted.

Figure 10:
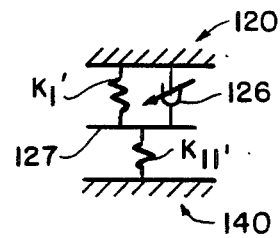
FIG. 10 is a mechanically-equivalent schematic of another embodiment of a mount portion of the system of FIG. 1.

The mechanical equivalent-circuit diagram for a different engine mount is shown in FIG. 10. It comprises a pedestal 120 for receiving an engine and a mounting fixture 140 for attachment to a vehicle. Resilient element $K_{II}$ units an intermediate plate 127 with the mounting fixture and, through resilient element $K_I$ and a clutch 126 with the pedestal. It is advisable that resilient element $K_{II}$ have a harder spring characteristic than resilient element $K_I$ also in this case.

The considerations set forth above with respect to FIGS. 2 and 3 are applicable also to this system when it is borne in mind that the lower resonance frequency corresponds to the series circuit of the two resilient elements $K_I$ and $K_{II}$, and the higher resonant frequency to that of resilient element $K_{II}$, since resilient element $K_I$ in the respective operating situation is bridged, as it were, by the actuated clutch.

Figure 11:
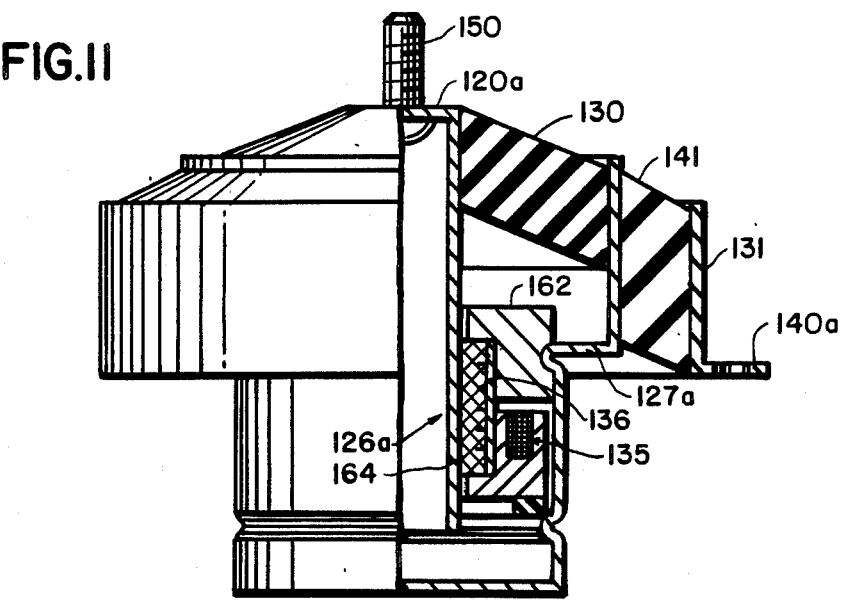
FIG. 11 is an elevation, partly in section, of one embodiment of the mount of FIG. 10.

The engine mount according to FIG. 11 corresponds to FIG. 10. It has an annular mounting fixture 131 made of sheet steel and provided with three flanges 140a (only one shown) for securing the engine mount to the chassis. Disposed concentrically in the mounting fixture 1 are an intermediate ring (plate) 127a and an innermost friction cylinder 120a which also serves as the pedestal for attachment by a threaded stud 150 to the engine. The mounting fixture and intermediate ring are united by a resilient element 141 ($K_{II}$ in FIG. 10) which has a particularly hard spring characteristic.

The intermediate ring 27 is attached, in turn, to the friction cylinder/pedestal 120a by a second resilient element 130 ($K_I$ in FIG. 10) having a softer spring characteristic. It also forms a clutch housing. The clutch housing encloses axially-compressible parts of clutch 126a. An annular electromagnet 135 is separated by a space 136 from an iron member 162. These which, together, hold a clamping sleeve 164 about the friction cylinder/pedestal 120a. Actuation of the clutch is, therefore, similar to that described in connection with FIG. 9. However, in this case, engaging the clutch will not result in the first resilient element 141 being supplemented by the second resilient element 130 but rather in bridging, that is, a bypassing, the second resilient element 130. In result, however, resonant frequency is shifted as before described.

The sensor and its associated clutch-operating units are not shown in FIG. 11.

Figure 12:
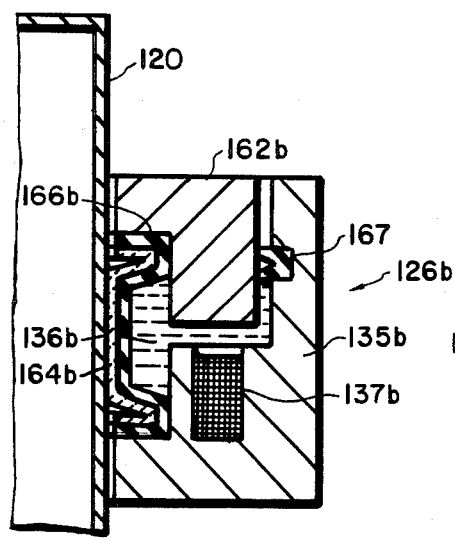
FIG. 12 is half a sectional elevation of another embodiment of a clutch portion of the mount of FIG. 11.

FIG. 12 shows a clutch 126b similar to that of FIGS. 9 and 11 but electro-hydraulically operated. Energizing the coil 137b draws magnet core 135b and iron ring 162b together. The axially compresses a clamping sleeve 164b therebetween but, to then force the clamping sleeve radially inward against a friction cylinder 120b, the space 136b is between the magnetic core and iron ring is filled with a substantially-incompressible liquid. Toward the friction cylinder, the space 136b is sealed by a diaphragm 166b which extends along the clamping sleeve 164b and between the iron ring 162b and the magnet core 135b, by a sliding seal 167. Thus, when current flows through the coil 137b to attract the iron ring 162b and close the space 136b, the liquid presses the clamping sleeve through the diaphragm against the friction cylinder.

Figure 13:
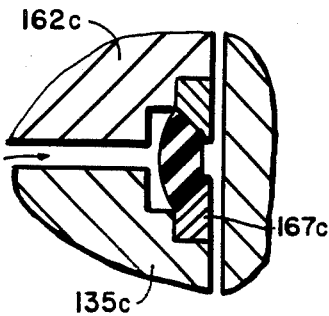
FIG. 13 is a partial sectional elevation of another embodiment of a clutch portion of the mount of FIG. 11.

FIG. 13 shows a sealing member 167c which is used in place of the sliding seal 167b of FIG. 12 to seal the space 136c between an iron ring 162c and the magnet core 135c. The sealing member 167c is formed by two rigid rings which are firmly seated in the iron ring and the magnet core. These rings are interconnected by an annular rubber-elastic body which is arched inwardly toward the gap 136c. When the iron ring 22 is attracted by the electromagnet, the annular body arches inwardly still more.

Figure 14:
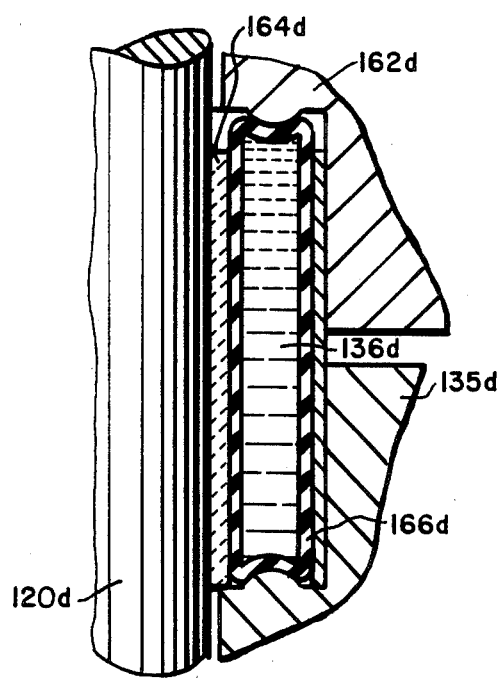
FIG. 14 is a partial sectional elevation of another embodiment of a clutch portion of the mount of FIG. 11.

FIG. 14 shows another alternative for the seals 166b, 167 of an electrohydraulic clutch similar to that of FIG. 12. In this embodiment, the clamping member is a friction sleeve 164d and the seals are a flexibly-walled chamber 166d which encloses the liquid-filled space 136d. When the iron ring 162d is attracted by the electromagnet 135d they compress the chamber 166d to press the friction sleeve 164d against a friction cylinder 120d.

Figure 15:
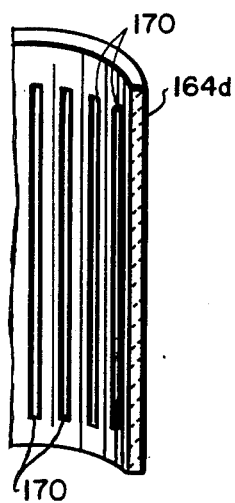
FIG. 15 is a partial elevation, partly in section, of a portion of the embodiment of FIG. 14.

FIG. 15 shows the inside of the friction sleeve 164d of FIG. 14 in detail. It has longitudinal slots 170 to permit it to be pressed onto the friction cylinder without much resistance.

If the friction sleeve 32 is fabricated from polytetrafluoroethylene, a lower coefficient of friction than from other possible materials will have to be tolerated, but the unfavorable, stick-slip effect is then avoided, because with that material, there is no abrupt change between the coefficients of static and sliding friction.

It will be understood that the instant specification and claims are set forth by way of illustration and not of limitation, and that various changes and modifications may be made without departing from the spirit and scope of the present invention.

What is claimed is:

1. A mount for connecting two relatively-vibratable objects, comprising:
   two resilient elements and a signal-actuated clutch for connecting two relatively-vibratable objects in the direction of the relative vibrations thereof, the clutch being in parallel with one of the resilient elements and in series with the other; and
   sensor means responsive to the relative vibrations of the objects at least at a resonant frequency of the mount with a signal for actuating the clutch, thereby to change the transfer function of the mount so as to avoid the resonant frequency of the mount.

2. The mount of claim 1, wherein the clutch and one of the resilient elements are connected in series as a unit for connecting the objects and the other resilient element is in parallel with the unit for connecting the objects.

3. The mount of claim 1, and further comprising intermediate means connected to the clutch and one of the resilient elements for connecting these to one of the objects in parallel and connected to the other resilient element for connecting it to the other of the objects.

4. An engine mount for a vehicle, comprising:
    a pedestal for connection to the engine;
    a mounting fixture for connection to the vehicle;
    a first resilient element connected between the pedestal and mounting fixture;
    a second resilient element and signal-actuated clutch connected in series between the pedestal and mounting fixture; and
    sensor means responsive to relative vibration between the pedestal and mounting fixture with a corresponding signal for engaging the clutch when the signal exceeds a threshold value.

5. The engine mount of claim 4, wherein the maximum holding force of the clutch engagement is less than the maximum spring force of the first resilient element.

6. The engine mount of claim 4, wherein the spring force of the first resilient element is smaller than the spring force of the second resilient element.

7. The engine mount of claim 6, wherein the ratio of the spring force of the second resilient element to that of the first is from about 2 to about 4.

8. The engine mount of claim 4, wherein the clutch comprises interfitting plates, alternate ones of the plates forming the opposite ends of the clutch in the direction of the vibration and magnetic means for variably holding the plates together.

9. The engine mount of claim 8, wherein the interfitting plates have complementary chevron shapes in the direction of the vibration.

10. The engine mount of claim 9, wherein the angle of the chevron shape of the plates is from about 5° to about 15°.

11. The engine mount of claim 4, wherein the clutch comprises a friction column connected to one end of the clutch and magnetically-actuatable clamping surface means connected to the other end of the clutch for clamping about the friction column.

12. The engine mount of claim 11, wherein the clamping surface means comprises magnetically-actuatable means for producing a fluid pressure and means responsive to the fluid pressure for clamping about the friction column.

13. An engine mount for a vehicle, comprising:
    first and second resilient elements and a signal-actuated clutch;
    a pedestal for connection to the engine;
    a mounting fixture for connection to the vehicle;
    intermediate means between the pedestal and mounting fixture for connecting the first resilient element and the clutch in parallel therefrom to one of the pedestal and mounting fixture and for connecting tne second resilient element therefrom to the other of the pedestal and mounting fixture; and
    sensor means responsive to relative vibration between the pedestal and mounting fixture with a corresponding signal for engaging the clutch when the signal exceeds a threshold value.

14. The engine mount of claim 13, wherein the maximum holding force of the clutch engagement is less than the maximum spring force of the first resilient element.

15. The engine mount of claim 13, wherein the spring force of the first resilient element is smaller than the spring force of the second resilient element.

16. The engine mount of claim 15, wherein the ratio of the spring force of the second resilient element to that of the first is from about 2 to about 4.

17. The engine mount of claim 13, wherein the clutch comprises interfitting plates forming, alternately, opposite ends of the clutch in the direction of the vibration and magnetic means for variably holding the plates together.

18. The engine mount of claim 17, wherein the interfitting plates have complementary chevron shapes in the direction of the vibration.

19. The engine mount of claim 18, wherein the angle of the chevron shape of the plates is from about 5° to about 15°.

20. The engine mount of claim 13, wherein the clutch comprises a friction column connected to one end of the clutch and magnetically-actuatable· clamping surface means connected to the other end of the clutch for clamping about the friction column.

21. The engine mount of claim 20, wherein the clamping surface means comprises magnetically-actuatable means for producing a fluid pressure and means responsive to the fluid pressure for clamping about the friction column.

* * * * *